(12) United States Patent
Hulett et al.

(10) Patent No.: US 8,944,354 B2
(45) Date of Patent: Feb. 3, 2015

(54) APPARATUS, SYSTEMS, AND METHODS FOR GRINDING A MATERIAL

(75) Inventors: Randy Hulett, Seattle, WA (US); Izaak Koller, Seattle, WA (US); Brian Shay, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 452 days.

(21) Appl. No.: 13/251,157

(22) Filed: Sep. 30, 2011

(65) Prior Publication Data

US 2013/0082130 A1   Apr. 4, 2013

(51) Int. Cl.
*A47J 42/50*   (2006.01)
*A47J 31/42*   (2006.01)

(52) U.S. Cl.
CPC . *A47J 31/42* (2013.01); *A47J 42/50* (2013.01)
USPC .......................................... 241/100; 241/277

(58) Field of Classification Search
CPC .................................. A47J 42/50; A47J 42/00
USPC ......... 241/100, 225, 277, 281; 99/286, 289 R
See application file for complete search history.

(56) References Cited

U.S. PATENT DOCUMENTS

| | | |
|---|---|---|
| 4,913,037 A | 4/1990 | Newnan |
| 5,241,898 A | 9/1993 | Newnan |

FOREIGN PATENT DOCUMENTS

| | | |
|---|---|---|
| EP | 0 605 750 A1 | 7/1994 |
| EP | 1 597 991 A1 | 11/2005 |
| WO | WO 2009/046771 A1 | 4/2009 |
| WO | WO 2010/033023 A2 | 3/2010 |
| WO | WO 2010/033023 A3 | 3/2010 |
| WO | WO 2010/095937 A1 | 8/2010 |

OTHER PUBLICATIONS

Invitation to Pay Additional Fees and Communication Relating to the Results of the Partial International Search Report; Application No. PCT/US2012/054515, filing date of Sep. 10, 2012, date of mailing Nov. 2, 2012, 6 pages.
International Search Report and Written Opinion; Application No. PCT/US2012/054515, filing date of Sep. 10, 2012, date of mailing Jan. 7, 2013, 16 pages.

*Primary Examiner* — Mark Rosenbaum
(74) *Attorney, Agent, or Firm* — Knobbe, Martens, Olson & Bear, LLP

(57) ABSTRACT

An apparatus is disclosed for containing a material, such as coffee beans, that may be used with a grinding apparatus. The apparatus may have a directing component to guide a controlled dose of material toward the grinding apparatus. In one embodiment, the apparatus comprises a container with a base portion that engages a grinding apparatus. The container, when engaged with the grinding apparatus, can direct coffee beans toward the grinding apparatus and has a door that releases a controlled dose of beans. A grinding apparatus is also disclosed that may have a movable tongue to cause excess grounds caught on interior components of the grinding apparatus to exit the grinding apparatus. The apparatus, systems, and methods reduce labor associated with grinding the material and allow a user, such as a barista, to more efficiently prepare brewed beverages, such as single-cup portions of coffee.

42 Claims, 14 Drawing Sheets

APPARATUS, SYSTEMS, AND METHODS FOR GRINDING A MATERIAL

FIELD

The present disclosure generally relates to apparatus for grinding a material, such as coffee beans, as well as systems and methods for grinding a material.

BACKGROUND

At the outset of preparing a coffee beverage, a user, such as a barista, typically measures an appropriate amount of coffee beans on a scale and then pours the beans into a grinding machine to grind them. The measuring process involves several discrete steps and, in some circumstances, the process can take 30 seconds or more to complete, which may be relatively long in a fast-paced environment such as a busy coffee shop. Moreover, such a measuring process may result in inconsistencies in the appropriate amount of coffee beans to be ground because different types of coffee beans may vary with respect to physical characteristics of the beans, such as size and density.

After the grinding process is complete, whole or partially ground beans may remain in the grinding machine and residue from coffee grounds may cover internal components of the machine. A barista typically cleans the grinding machine before using the machine to grind a different type of coffee beans. Maintaining the grinding machine in the foregoing situation and others can be inefficient and cumbersome, especially when grinding and brewing single-cup portions of coffee.

SUMMARY

One embodiment provides an apparatus for containing a material. The apparatus includes a body portion configured to contain the material and a base portion configured to engage with the body portion. The base portion includes a directing component and a surface defining an opening. The directing component is configured to guide the material toward the opening. The base portion is configured to engage with a grinding apparatus to actuate the directing component.

In another embodiment, a system is provided that includes a container and a grinding apparatus. The container includes a body portion configured to contain a material and a base portion configured to engage with the body portion. The base portion includes a directing component and a surface defining an opening. The directing component is configured to guide the material toward the opening. The grinding apparatus is configured to engage with the container to actuate the directing component and to grind the material.

In another embodiment, an apparatus is provided that includes a grinding component for grinding a material. A funnel is configured to receive ground material from the grinding component and to direct ground material out of the apparatus. The apparatus includes a tongue in communication with the funnel. The tongue is configured to move to cause excess ground material caught on interior components of the apparatus to exit the apparatus.

For purposes of the present disclosure and summarizing distinctions from the prior art, certain aspects of the apparatus, systems, and methods have been described above and will be described further below. Of course, it is to be understood that not necessarily all such aspects may be present in any particular embodiment. Thus, for example, those skilled in the art will recognize that the apparatus, systems, and methods may be embodied or carried out in a manner that achieves or optimizes one aspect or group of aspects as taught herein without necessarily achieving other aspects as may be taught or suggested herein. All of these embodiments are intended to be within the scope of the present disclosure herein disclosed.

BRIEF DESCRIPTION OF THE DRAWINGS

These and other features, aspects, and advantages of the disclosed apparatus, systems, and methods will now be described in connection with embodiments shown in the accompanying drawings. The illustrated embodiments are merely examples and are not intended to limit the apparatus, systems, and methods. The drawings include the following figures, which can be briefly described as follows.

DETAILED DESCRIPTION

Figure 1:
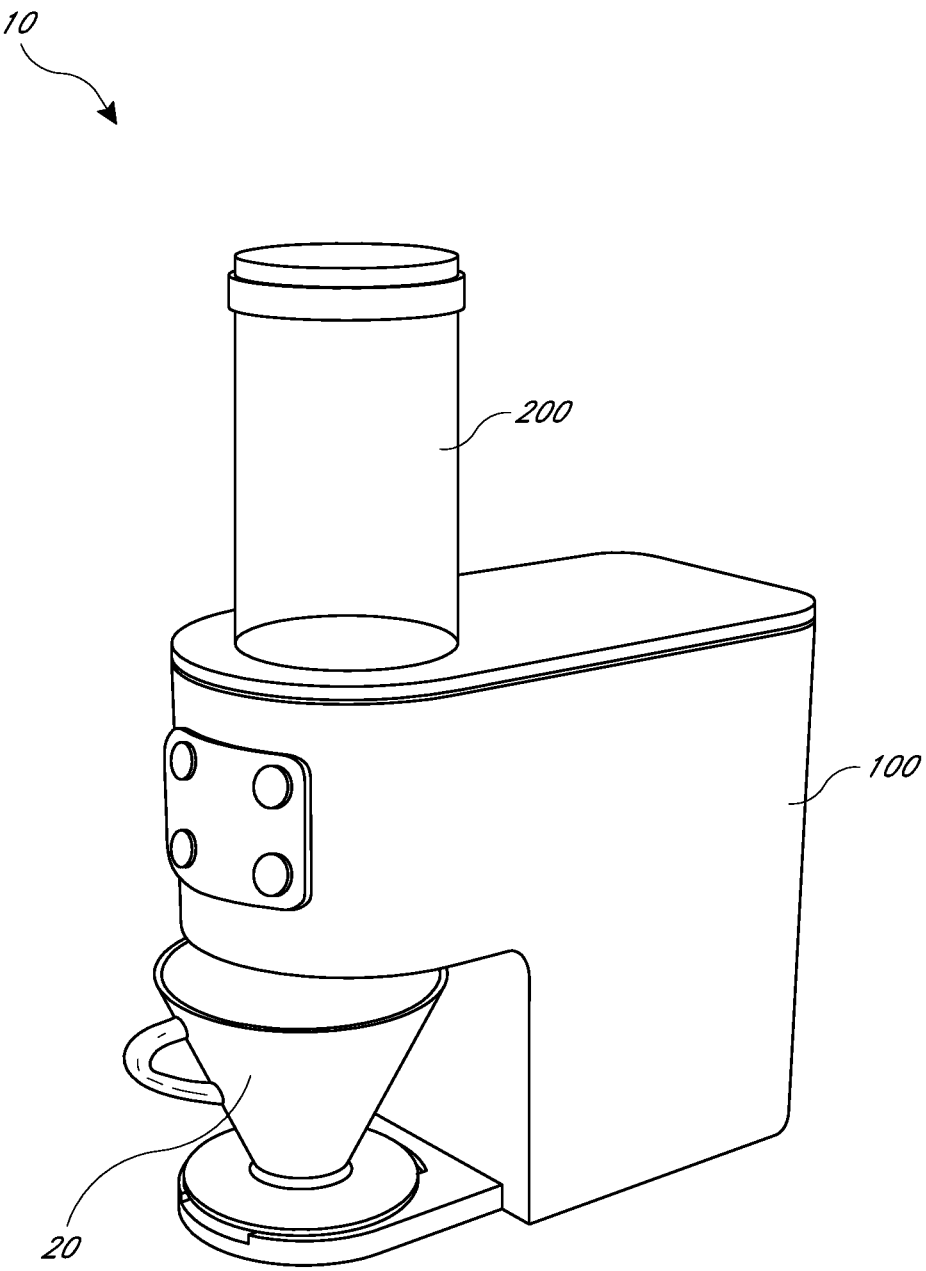
FIG. 1 is a perspective view of an embodiment of a system for grinding a material, such as coffee beans.

Conventional apparatus and methods to grind a material, such as coffee beans, are inefficient, particularly when grinding a small quantity of the material. A user, such as a barista, may be less likely to enthusiastically promote single-cup portions of coffee because the process to grind and brew the coffee involves several steps and may require the barista to spend time measuring, weighing, and providing a relatively small portion of coffee beans to a grinding machine. Additionally, a user may want to offer several types of a brewed beverage, such as different types of coffee, to serve a wide variety of customers. When grinding and brewing single-cup portions of coffee, however, it is particularly cumbersome to clean a grinding machine each time that a customer desires a different type of coffee. As a result, some users limit the types of coffee made available to customers. Thus, there is a need for apparatus, systems, and methods for grinding a material that are efficient and easy to use or execute.

Embodiments described herein provide apparatus, systems, and methods to allow a user, such as a barista, to efficiently grind a material, such as coffee beans. For example, the disclosed embodiments provide for controlled dosing of coffee beans to a grinding machine so that a barista does not need to spend time and effort measuring an appropriate amount or dose of coffee beans to be ground. Different types of coffee beans typically have different bean sizes and densities. The apparatus, systems, and methods may recognize the type of coffee bean to be ground and accommodate for the bean size and density to provide an appropriate dose of beans and to grind the beans for an appropriate amount of time, which may result in a more consistent grinding process. In addition, the barista may easily use different types of coffee beans without needing to spend time and effort cleaning the grinding machine between uses. This will allow a barista to offer many types of coffee for single-cup portions that are prepared when a customer places an order. The disclosed embodiments may also communicate with a beverage brewing apparatus to transmit and/or receive information relating to material type and beverage size, thereby requiring minimal user input and providing an efficient system to grind and brew the material.

The disclosed embodiments provide systems having a container to store coffee beans, where the container includes a built-in directing component, such as an auger. The directing component may guide coffee beans toward an opening in the container. The container may also have a door to release a desired amount of coffee beans. The container may be attached to a grinding apparatus to activate the directing component. For example, the grinding apparatus may comprise an auger that is embedded in a base portion of the container. The auger may direct a controlled dose of coffee beans through the opening and to a grinding apparatus. The grinding apparatus may then grind the beans. After the grinding process is complete, the container may be removed from the grinding apparatus. In such embodiments, the directing component is disposed in the removable container instead of the grinding apparatus.

Although embodiments will be discussed below in terms of apparatus, systems, and methods for grinding and brewing a coffee beverage using coffee beans, the disclosed embodiments may also be employed to grind other types of materials that are ground and mixed with a fluid to form a beverage. Furthermore, the disclosed apparatus, systems, and methods may be used or employed in a commercial setting, such as at a coffeehouse or coffee shop, or in a residential setting, such as at a user's home. While the term "user" may be referred to as a barista in some embodiments and applications, the user may includes other individuals such as a manager, employee, customer, client, colleague, family member, friend, acquaintance, or any other individual. In some embodiments, the user may include a machine instead of, or in addition to, a person.

FIG. 1 illustrates a system 10 for grinding a material. The system 10 comprises a grinding apparatus or grinding machine 100 and an apparatus for containing a material or a container 200. The illustrated embodiment also shows a material holder 20 for receiving ground material. The material holder 20 may comprise a filter holder, which is illustrated in FIG. 1, to be used with pour-over beverage brewing machines or any other suitable holder for containing the ground material to be used with any type of beverage brewing apparatus or machine. The container 200 is configured to engage with the grinding apparatus 100 to provide a dose of coffee beans to the grinding apparatus 100.

The grinding apparatus 100 may comprise standard components of a grinding machine such as a motor and a grind head. Many conventional grinding apparatus also include a directing component, such as an auger, to direct coffee beans toward grinding components of the grinding machine. In some embodiments of the disclosed system 10, the grinding apparatus 100 does not include a directing component to direct the material toward grinding features. Instead, the container 200 comprises a directing component to direct or guide the material toward an opening in the container. In such embodiments, the system 10 may be easier to use than conventional grinding systems because, for example, a user may not need to clean the grinder apparatus 100 between uses since controlled doses of coffee beans may be provided to the grinding apparatus 100, thereby minimizing leftover coffee beans and residue in the grinding apparatus 100. In other embodiments, however, both the grinding apparatus 100 and the container 200 may include directing components to direct coffee beans. The grinding apparatus 100 may include a control panel with various control buttons corresponding to different sizes of coffee cups. A barista may select a particular control button to convey information about the desired coffee size and to initiate the grinding process.

The container 200 may have characteristics of any suitable container or canister used to store coffee beans. In one embodiment, the container 200 is substantially air-tight when in a closed configuration to preserve the life and freshness of coffee beans stored therein. The container 200 may be configured to store a variety of different types of coffee beans, which may have different sizes, shapes, and densities. The system 10 may employ many different containers 200 such that a user may exchange one container for another to use with the grinding apparatus 100. In such an embodiment, the modular nature of the containers, as well as other features, allows a user to efficiently and easily grind a variety of different types of coffee beans with minimal maintenance of the grinding apparatus 100. During operation, the container 200 may also serve to function as a hopper for the system 10. For example, the container 200 can contain and deliver coffee beans to a grinding element of the system 10 to grind the coffee beans.

Figure 2:
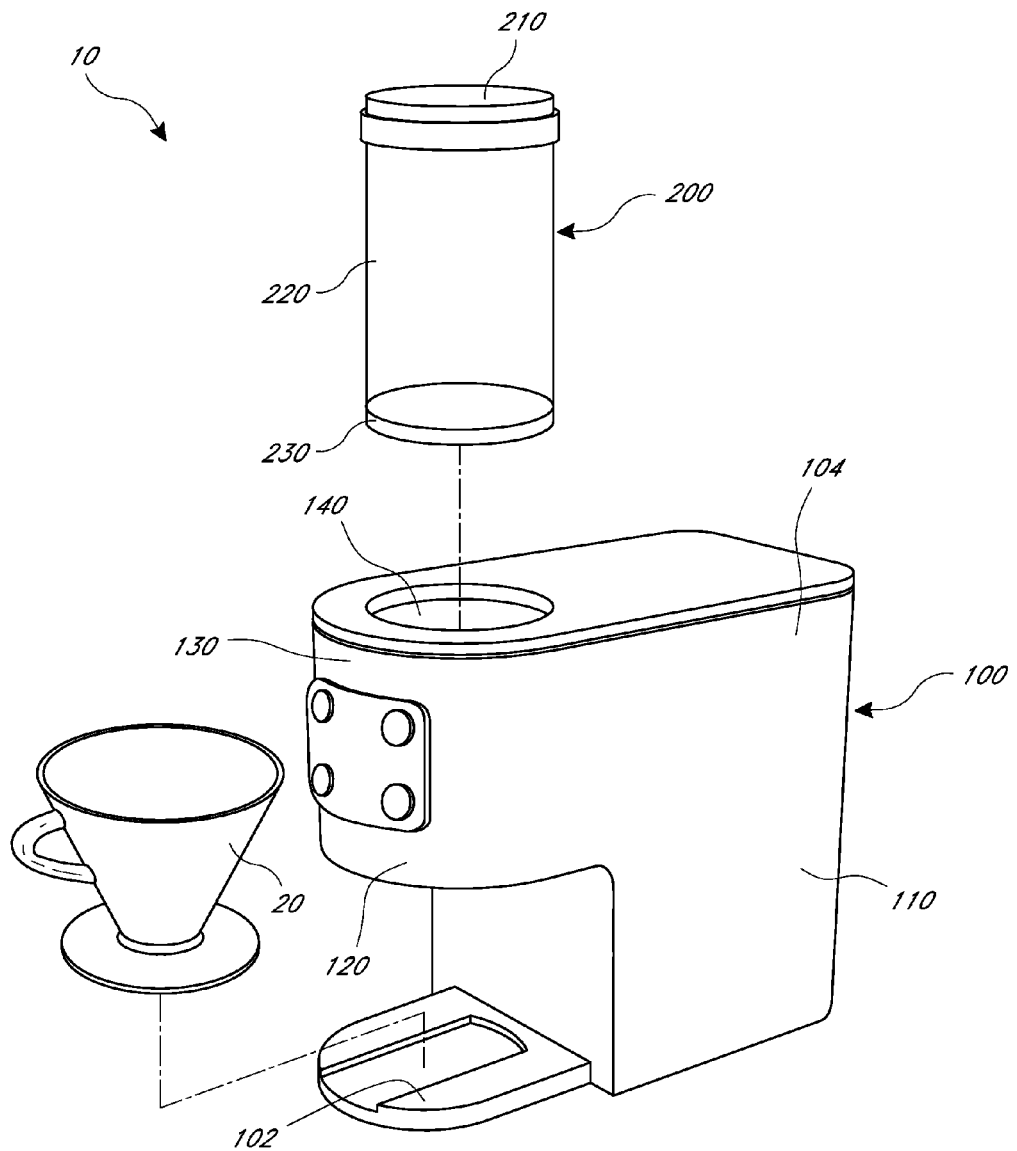
FIG. 2 is an exploded perspective view of the system shown in FIG. 1.

FIG. 2 shows the system of FIG. 1 in an exploded configuration. The apparatus for containing a material 200 may be removed from the grinding apparatus 100. In one embodiment, the grinding apparatus 100 comprises a rear portion 110 and a front portion 120. The front portion 120 may comprise an engagement portion 130 configured to engage with the container 200. In the illustrated embodiment, the engagement portion 130 defines an opening 140 configured to receive at least a portion of the container 200. The grinding apparatus 100 may also comprise a cover 104 that may be removably attached to the grinding apparatus 100. The cover 104 may be removed to access internal components of the grinding apparatus 100.

Figure 11:
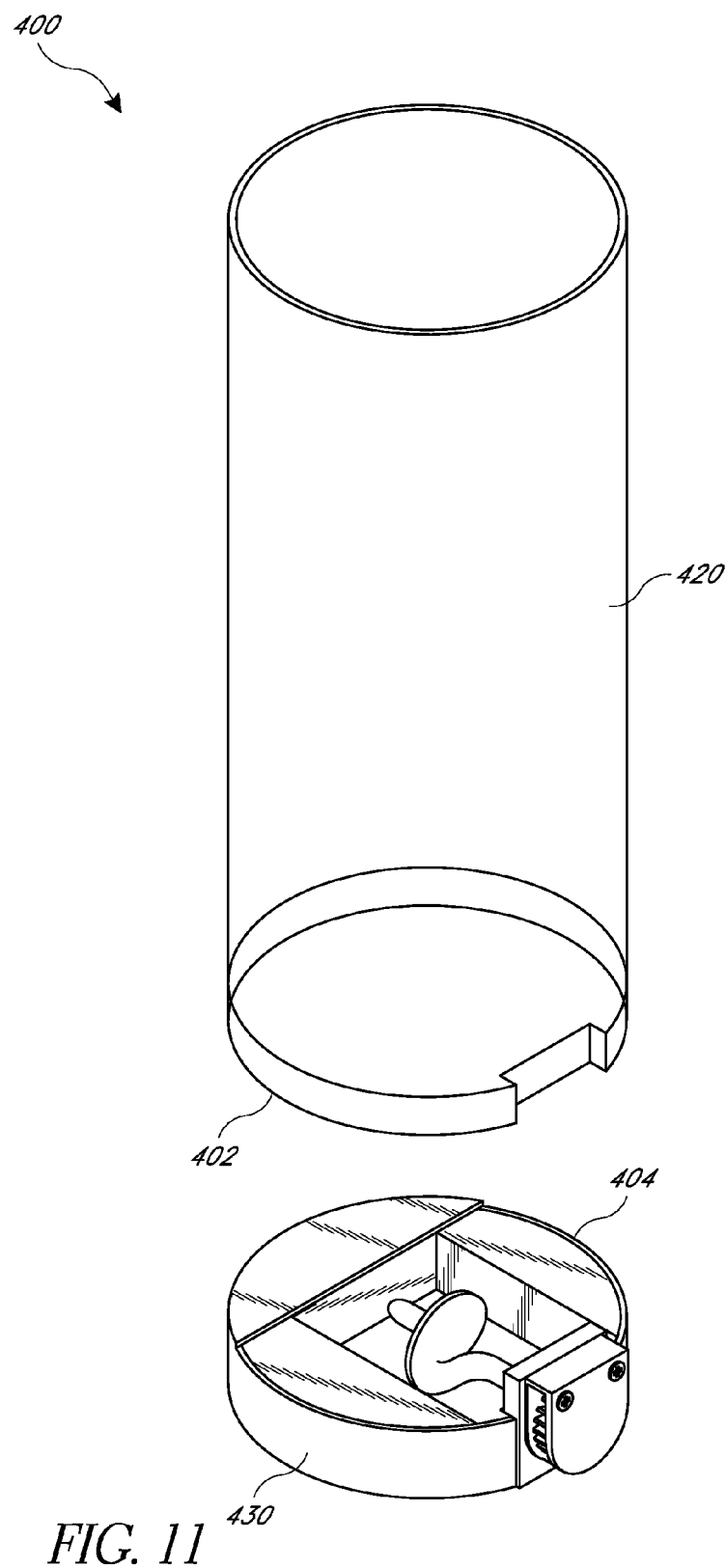
FIG. 11 is a perspective view of an embodiment of an apparatus for containing a material where the body portion and the base portion are separate components.

The container 200 may comprise a body portion 220 and a base portion 230. In some embodiments, the base portion 230 is configured to engage with the body portion 220 such that the base portion 230 is integral with the body portion 220 of the container 200. In other embodiments, the base portion 230 may be configured to be removably attached to the body portion of the container 220 such that the base portion 230 and the body portion 220 comprise separate components when detached from each other. One embodiment of such a configuration is illustrated in FIG. 11 and will be described below with reference to that figure. As illustrated in FIG. 2, the container 200 may include a cap 210 to close and seal the container 200.

The container 200 may include identification information about the coffee beans contained therein. Such identification information may be transmitted to the grinding apparatus 100 so that the grinding apparatus 100 can determine how long to grind a particular type of coffee. The system 10 may also transmit such identification information, as well as the size of coffee portion desired by a customer, to a beverage brewing apparatus so that the beverage brewing apparatus can determine how long to brew the coffee. In some embodiments, the container 200 and/or the grinding apparatus 100 may include an optical identification component to receive, store, and transmit such identification information.

The material holder 20 may also be removed from the grinding apparatus 100. The grinding apparatus 100 may include a support member 102 for supporting the material holder 20 when the system 10 is being used to grind a material. After coffee beans are ground and received in the material holder 20, the material holder 20 may be removed from the support member 102 of the grinding apparatus 100 and provided to a beverage brewing apparatus to brew the coffee.

Figure 3:
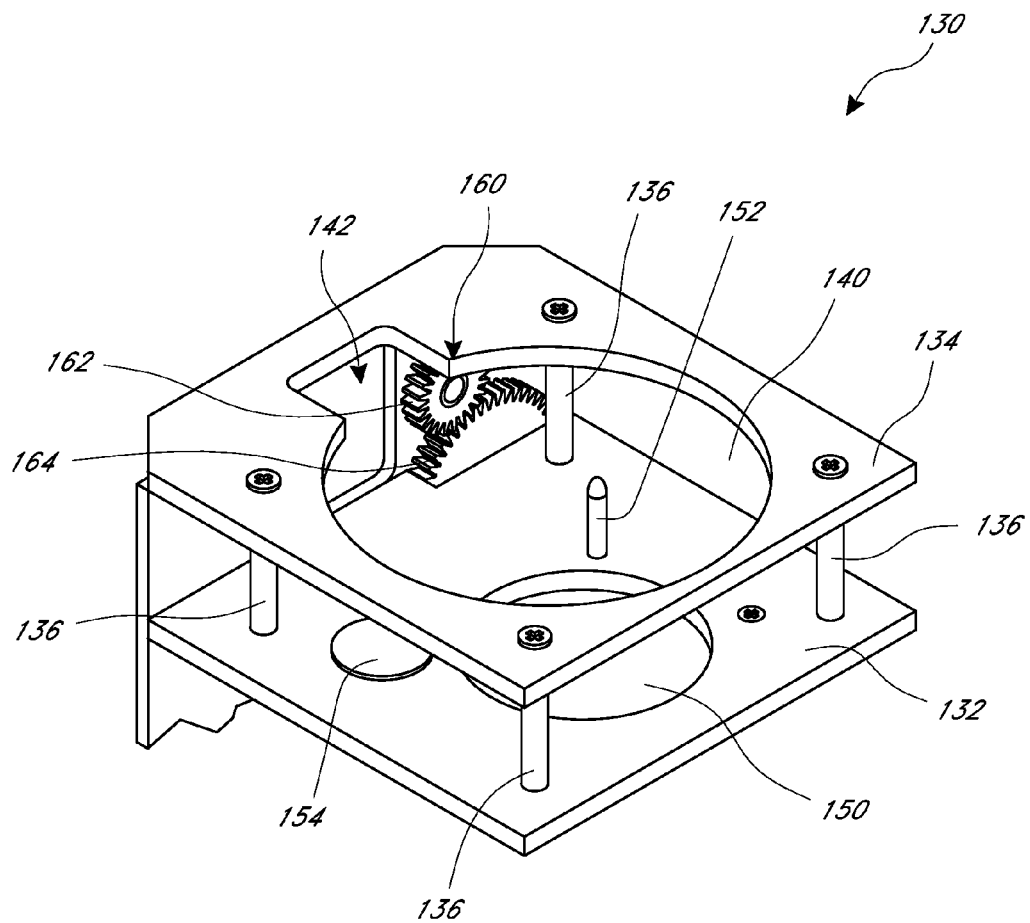
FIG. 3 is a rear perspective view of an embodiment of an engagement portion of a grinding apparatus.

Embodiments of the grinding apparatus 100 will be further described with reference to FIGS. 3-6. FIG. 3 shows a rear perspective view of the engagement portion 130 of the grinding apparatus 100. As previously described in reference to FIG. 2, the grinding apparatus may comprise a rear portion 110 and a front portion 120. The front portion 120 comprises an engagement portion 130 configured to receive a container of coffee beans.

Figure 7:
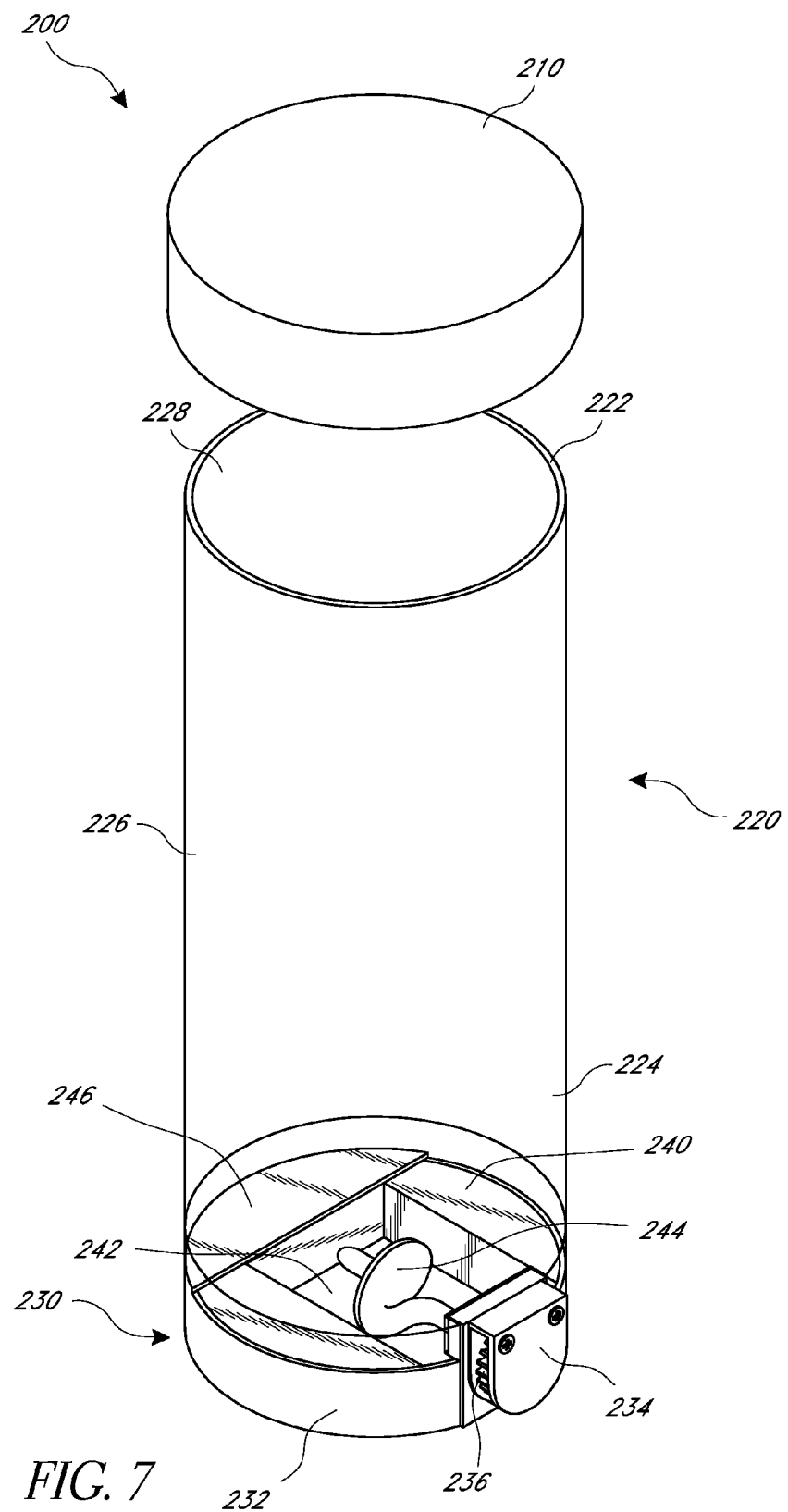
FIG. 7 is a perspective view of an embodiment of an apparatus for containing a material.

Returning to FIG. 3, in the illustrated embodiment, the engagement portion 130 comprises a first surface 132 and a second surface 134. The second surface 134 is attached to the first surface 132 by one or more support members 136 such that second surface 134 is disposed above the first surface 132. In other embodiments, the second surface 134 may have other orientations with respect to the first surface 132, such as to the side of, in front of, behind, or below the first surface 132. The second surface 134 may define an opening 140 to receive at least a portion of a container. In the illustrated embodiment, the opening 140 is substantially circular in configuration. However, the opening 140 may define other configurations to receive a suitable container, including, but not limited to, substantially rectangular, triangular, ovoid, or elliptical. The opening 140 may include a recessed portion 142 configured receive a protruding portion of the container 200, such as an actuator housing. An actuator housing 234 of the container 200 is shown in FIG. 7.

Figure 5:
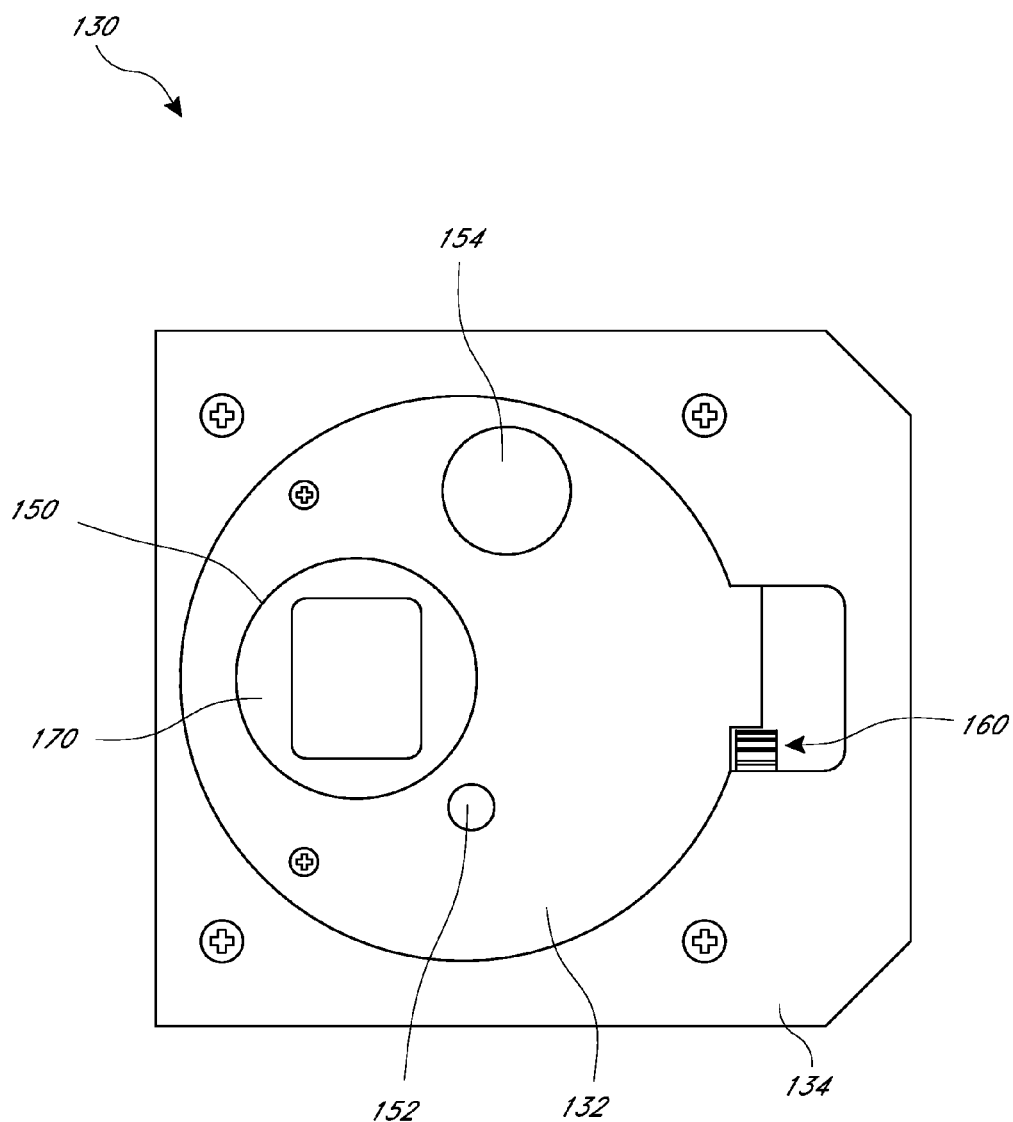
FIG. 5 is a top plan view of the engagement portion of FIG. 3.
Figure 6:
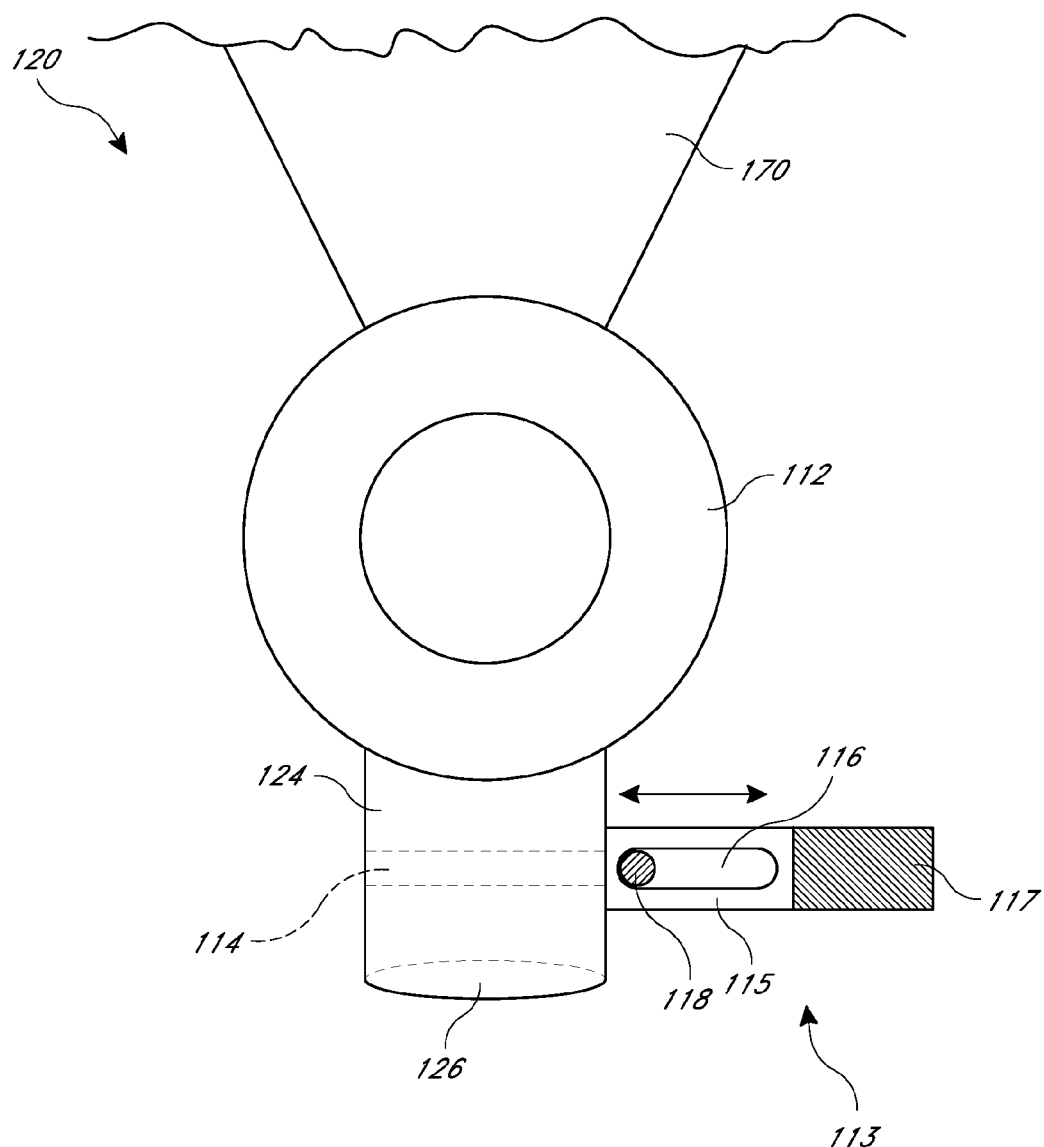
FIG. 6 is a front side view of a portion of the system of FIG. 1 illustrating a tongue portion of the system of FIG. 1.

Continuing with reference to FIG. 3, the first surface 132 of the engagement portion 130 may define an opening 150 to allow coffee beans to pass therethrough. A funnel 170 (which is depicted in FIGS. 5 and 6) may be attached to the opening 150 to funnel coffee grounds to grinding features of the grinding apparatus 100 to grind the coffee beans. The first surface 132 may also include a door opening mechanism 152 and a securing component 154. The securing component 154 may interact with a container to attach and secure the container to the grinding apparatus 100 during operation. The securing component 154 may reduce the risk that a container is removed from the grinding apparatus 100 during operation. The securing component 154 may also be configured to detect a container and have a safety feature where the grinding apparatus 100 does not turn on unless the securing component 154 detects that at least a portion of the container is positioned at a suitable location with respect to the engagement portion 130. The securing component 154 may also detect when a container is removed from the engagement portion 130 and deactivate the grinding apparatus 100 when the container is removed.

In one embodiment, the securing component 154 comprises a magnet. In other embodiments, the securing component comprises an element configured to engage with a magnet disposed on a base portion of the container. The securing component 154 may also comprise a solenoid interlock that engages with the container, or an element that interacts with a solenoid interlock on the container. The securing component 154 may release when the grinding process is complete to allow a user to remove a container from the grinding apparatus 100. The securing component 154 may also comprise a Hall effect sensor to detect and secure a container of coffee beans. The securing component 154 may also comprise an optical sensor. In some embodiments, the securing component 154 may comprise one or more mechanical interlocks, including, but not limited to, an undercut or a lock that engages with a portion of the container.

The door opening mechanism 152 is configured to engage with the container 200 to open and close a door 260 (which is depicted in FIGS. 9 and 10A-10C) on the container 200 to release ground material from the container 200. In some embodiments, the door opening mechanism 152 comprises a movable pin. The pin 152 may move up and down with respect to first surface 132 of the engagement portion 130. In one configuration, a leading end of the pin 152 may be substantially flush with the first surface 132 such that the pin 152 is disengaged from a container when the container is connected to the engagement portion 130. In another configuration, a leading end of the pin 152 may project outward from the first surface 132 to engage the container to open a door 260 on the container 200. Movement of the pin 152 may be automatically controlled by the grinding apparatus 100 and dependent upon the type of coffee beans to be ground and/or the size of coffee portion desired by a user. The pin 152 may be actuated in a variety of ways, including, but not limited to, automatic actuation by using a solenoid.

Figure 8:
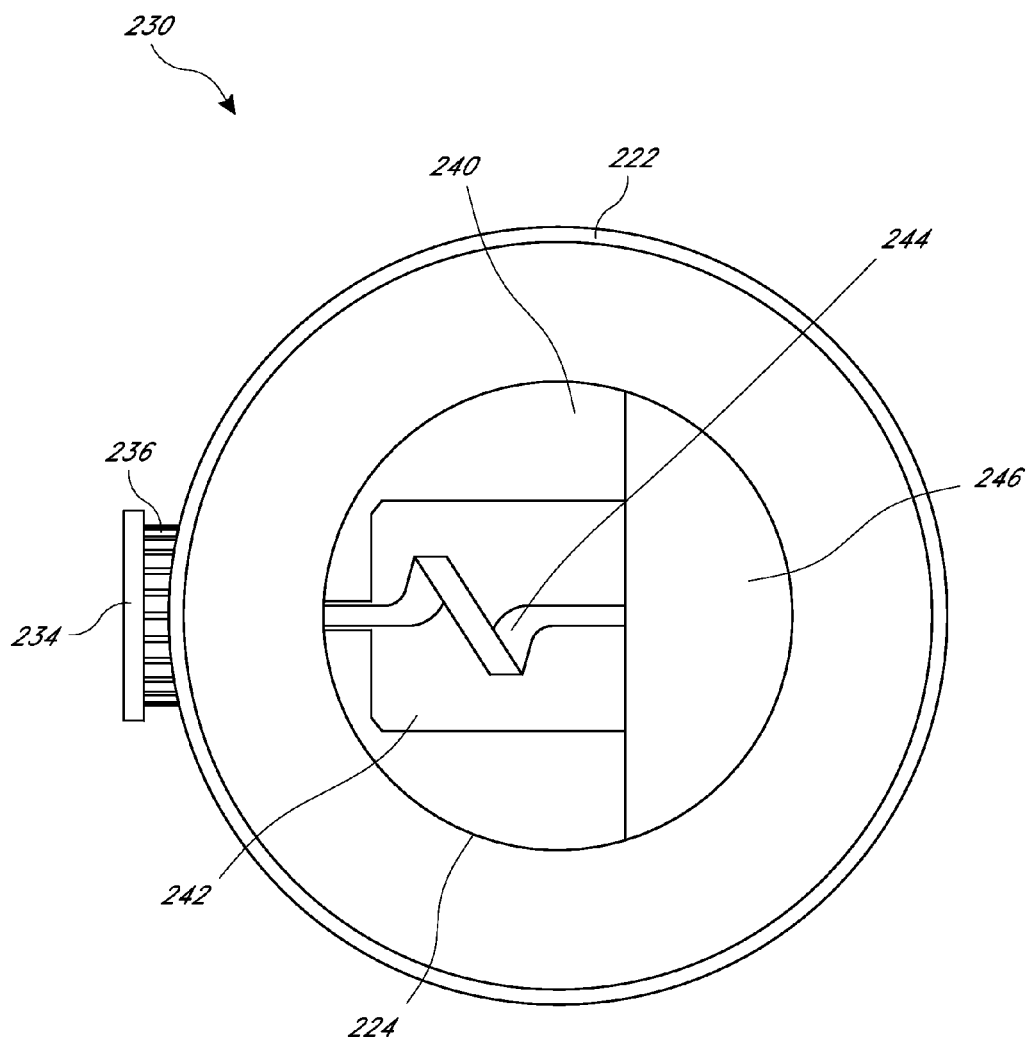
FIG. 8 is a top plan view of the apparatus of FIG. 7.
Figure 9:
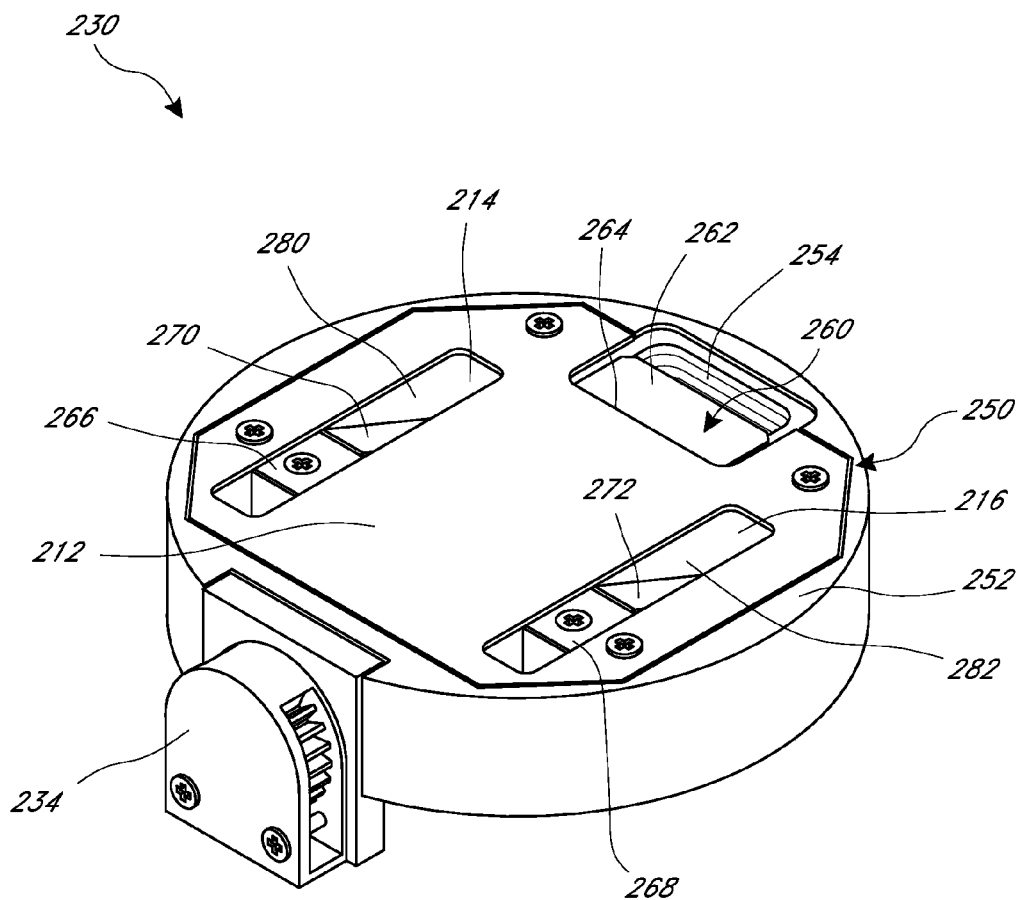
FIG. 9 is a perspective bottom view of a base portion of the apparatus of FIG. 7.

In some embodiments, the pin 152 may comprise a rigid component that does not move with respect to the first surface 132. In such embodiments, the pin 152 may engage the container 200 to open a door 260 (which is depicted in FIGS. 9 and 10A-10C) the container and to keep the door 260 open when the container 200 is engaged with the engagement portion 130 of the grinding apparatus 100. In such embodiments, a directing component 244, such as an auger, controls and limits the amount of coffee beans dispensed through the opening and into the grinding apparatus 100. FIGS. 7-9 illustrated embodiments of the container 200, directing component 244, and door 260. Other suitable door opening mechanisms 152 may be used, such as a variety of passive actuators, passive pushers, pivot pieces, and solenoids.

In some embodiments, a solenoid actuates the pin 152 and locks the pin 152 into the container 200 to ensure that the container 200 may not be removed from the grinding apparatus 100 during operation. In such embodiments, securing the container 200 to the grinding apparatus 100 by use of a solenoid-actuated pin may be used instead of the securing component 154. In other embodiments, the system 10 may comprise both a solenoid-actuated pin and a securing component 154.

With reference to FIG. 3, the engagement portion 130 may include an actuator portion 160. In one embodiment, the actuator portion 160 is configured to engage with an actuator of a container to actuate a directing component of the container to guide a desired amount of coffee beans toward an opening in the container. The actuator portion 160 of the engagement portion 130 may comprise a first gear 164 and a second gear 162. The first gear 164 is in communication with a motor of the grinding apparatus 100. The second gear 162 is configured to mate with the first gear 164. During operation, the motor may activate the first gear 164. The first gear 164 then will cause the second gear 162 to rotate with respect to a central pivot point.

Figure 4:
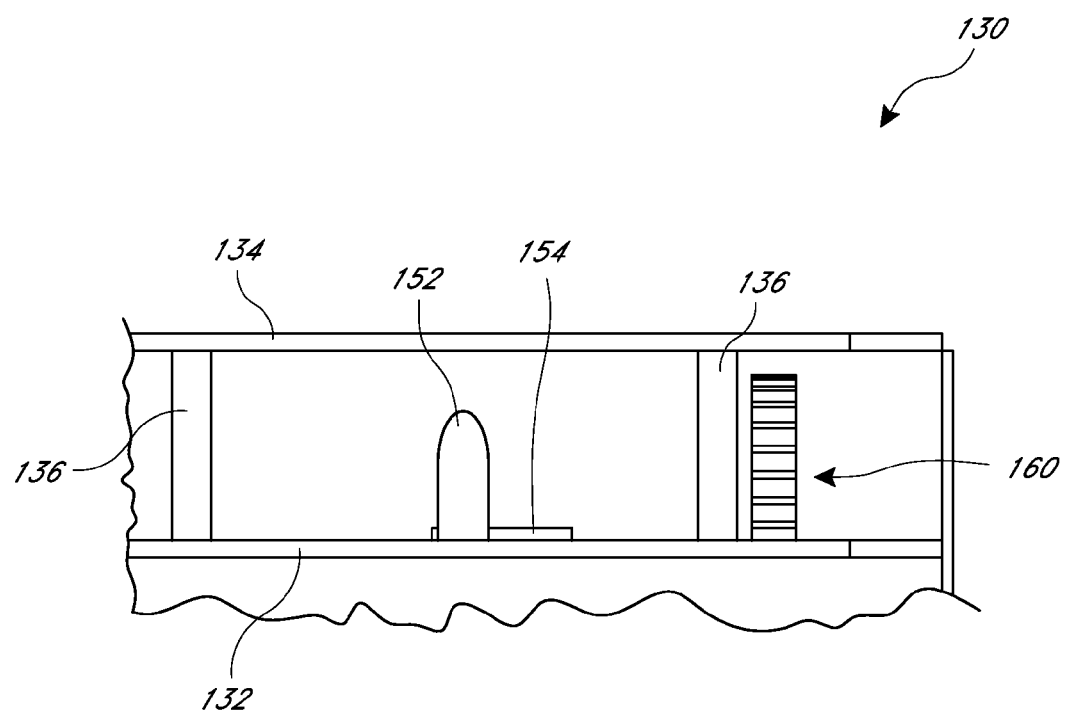
FIG. 4 is a side view of the engagement portion of FIG. 3.

FIG. 4 shows a side view of the engagement portion 130 of the grinding apparatus 100. In the illustrated embodiment, the door opening mechanism 152 protrudes and extends upwardly from the first surface 132. A distance between the first surface 132 and the second surface 134 may be similar to a height of a portion of the container 200 configured to engage with the grinding apparatus 100.

FIG. 5 illustrates a top view of the engagement portion 130. A perimeter edge associated with the opening 150 may couple to a funnel 170 to collect and funnel coffee beans to grinding components of the grinding apparatus 100. The door opening mechanism 152 is shown near a lower right portion of the opening 150 in FIG. 5. However, the door opening mechanism 152 may be positioned at other locations on the first surface 132. The engagement portion 130 may comprise more than one door opening mechanism 152. For example, a second door opening mechanism may be disposed on an opposite side of the opening 150 and be configured to engage with a base portion 230 of a container 200.

FIG. 6 shows an embodiment of the grinding apparatus 100 having an anti-static tongue to facilitate collection and release of excess ground coffee from the grinding apparatus 100. Static tends to cause coffee grinds to cling to internal components of grinding machines instead of being delivered to a material holder or coffee filter. The disclosed embodiment of a movable anti-static tongue is designed to address this issue.

As depicted in FIG. 6, the front portion 120 of the grinding apparatus 100 may comprise a funnel 170. In some embodiments, the funnel 170 is attached, either directly or indirectly, to the engagement portion 130 of the grinding apparatus 100. The funnel 170 is connected to a chute 124 at a lower end thereof. A portion of a grind head 112 of the grinding apparatus 100 is shown in FIG. 6 between the funnel 170 and the chute 124. The grind head 112 may comprise conventional grinding components configured to grind coffee beans. A tongue feature 113 may engage with the chute 124. In some embodiments, the tongue feature 113 comprises a support member 115 that defines a slot 116, an actuator 117, and a rod 118 attached to a tongue 114. The rod 118 may be configured to fit within the slot 116.

In a first position, as illustrated in FIG. 6, the tongue 114 may be configured within a portion of the chute 124 to direct coffee grounds to collect in a relatively compact space and to flow more uniformly through the chute 124. The actuator 117 may actuate the rod 118 so that the rod 118 moves linearly within the slot 116. In some embodiments, the actuator 117 comprises a solenoid. When the rod 118 translates in the slot 116 toward the actuator 117, the tongue 114 may also translate to facilitate substantially uniform flow of grounds through the chute 124 and opening 126. The rod 118 and tongue 114 may move back-and-forth with respect to the slot 118 and opening 126, respectively. Such movement may cause excess grounds caught on interior components of the grinding apparatus 100, such as an upper side of a filter, to exit the chute 125. Such movement may also cause the tongue 114 to reduce static of leftover coffee grounds that collect on an inside of the chute so that the leftover coffee grounds may be dispensed from the grinding apparatus 100. As explained above, in the illustrated embodiment, the actuator 117 is configured to move the tongue 114 along a linear path. In other embodiments, however, the actuator 117 may move the tongue along other path configurations, such as a rotational path. The actuator 117 may comprise a solenoid. In some embodiments, the tongue 114 may be flexible and bend downward upon accumulating coffee grounds. The tongue 114 may act as a spring, serve as a gate valve, and/or serve as a plate that is cantilevered from one side.

In some embodiments, the tongue 114 may be pulled away from the opening 126 after the grinding apparatus 100 is turned off. The tongue 114 may be pulled away, however, while grinding components are still rotating or moving so that movement of the tongue 114 dislodges or knocks down excess grinds caught on an interior portion of the grinding apparatus 100. The tongue 114 may also be actuated with an impact force such that the force further dislodges or removes excess grinds. The tongue 114 may contact a hard stop after being actuated with such an impact force. In some embodiments, the tongue 114 may be pulled away from the grinding apparatus 100 after the grinding apparatus 100 is turned off and after grinding components have stopped rotating or otherwise moving. In other embodiments, the tongue 114 may be pulled away from the grinding apparatus 100 while the grinding apparatus 100 is still turned on.

Turning to FIGS. 7-10, embodiments of an apparatus for containing a material or a container 200 will be described. The container 200 may include a body portion 220 and a base portion 230 attached to the body portion 220. The body portion 220 has a first end portion 222, a second opposing end portion 224, and a central portion 226 disposed between the end portions 222, 224. The first end portion 222 defines an opening 228 in the container 200. The opening 228 allows a user to add coffee beans to or remove beans from the container 200. In some embodiments, the opening 228 allows a user to access internal components of the container 200 to maintain and clean those components. The container 200 may include a cap 210 configured to engage with the first end portion 222 of the body portion 220 to substantially seal the container 200 from the surrounding environment. The base portion 230 may be integrally attached to the second end portion 224 of the body portion 220. The illustrated embodiment shows a substantially cylindrical container 200; however, the container 200 may comprise a variety of configurations, shapes, and sizes.

The base portion 230 of the container 200 may be configured to engage with the engagement portion 130 of the grinding apparatus 100. The base portion 230 of the illustrated embodiment has an outer surface 232 that fits through the opening 140 of the engagement portion 130 of the grinding apparatus 100. The outer surface 232 of the base portion 230 may have an actuator housing 234 configured to receive an actuator 236. In the illustrated embodiment, the actuator 236 comprises a gear. In some embodiments, the actuator 236 may comprise a friction wheel, a toothed belt, and/or a timing belt.

In some embodiments, the base portion 230 may include a solenoid and/or magnet configured to engage with a securing component 154 of a grinding apparatus 100 to securely attached the base portion 230 to an engagement portion 130 of the grinding apparatus 100. For example, a magnet may allow a grinding apparatus 100 to sense that the base portion 230 is engaged with the grinding apparatus 100. In some embodiments, the grinding apparatus 100 may not activate until it senses the magnet of the base portion 230, thereby improving safety to users when operating the system 100.

The base portion 230 may also have a support member 240 to help support and contain coffee beans disposed within the container 200. In one embodiment, the support member defines a channel 242 that is configured to receive and provide a recess for a directing component 244. The directing component 244 may be directly or indirectly connected to the actuator 236 of the base portion 230. When activated by the actuator 236, the directing component 244 may rotate about a central axis to guide coffee beans toward an opening 254 in a bottom surface 252 of the base portion 230. The opening 254 is shown in FIG. 9. In the illustrated embodiment, the directing component 244 comprises an auger. In some embodiments, the directing component 244 comprises a conveyor belt and/or a paddle wheel.

In some embodiments in which the directing component 244 comprises an auger, the system 10 may be configured to control the pitch of the auger so that the auger stops at substantially the same position each time the grinding process has finished. Doing so may improve the consistency of the amount of coffee beans released from the container 100. When the auger stops at different orientations, there may be some variance in the dose of coffee beans released because certain orientations may trap more or less beans than other orientations. For example, an encoder may be used to detect the pitch of the auger and facilitate positioning the auger in substantially the same position after each use.

The base portion 230 may also include a plate 246. As illustrated in FIG. 8, the plate 246 may be disposed over a portion of the support member 240 near a tip of the directing component 244 and over an opening in a bottom surface of the base portion 230. The plate 246 may assist in delivering ground coffee through the opening in the bottom surface by providing a barrier so that coffee grounds are directed toward the opening. The plate 246 may also provide safety functions by providing a barrier between a tip of the directing component 244 and an open space in the container where a user may place his or her hand. In some embodiments, the plate 246 may substantially cover the support member 240 to block inadvertent access to the directing component 244 while the directing component 244 is activated and directing coffee beans.

Figure 10A:
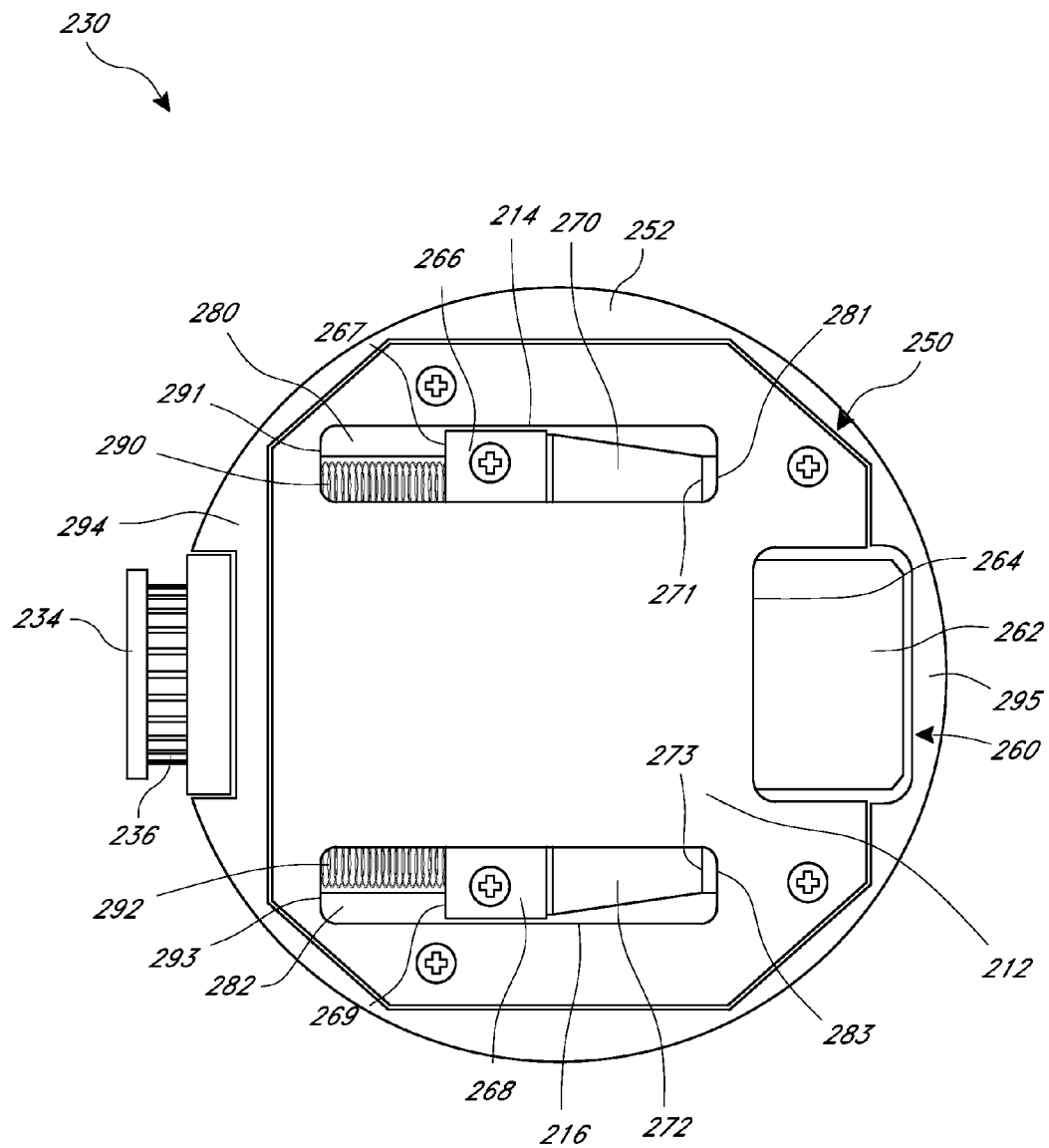
FIG. 10A is a bottom view of the apparatus of FIG. 7 with a door shown in a closed position.
Figure 10B:
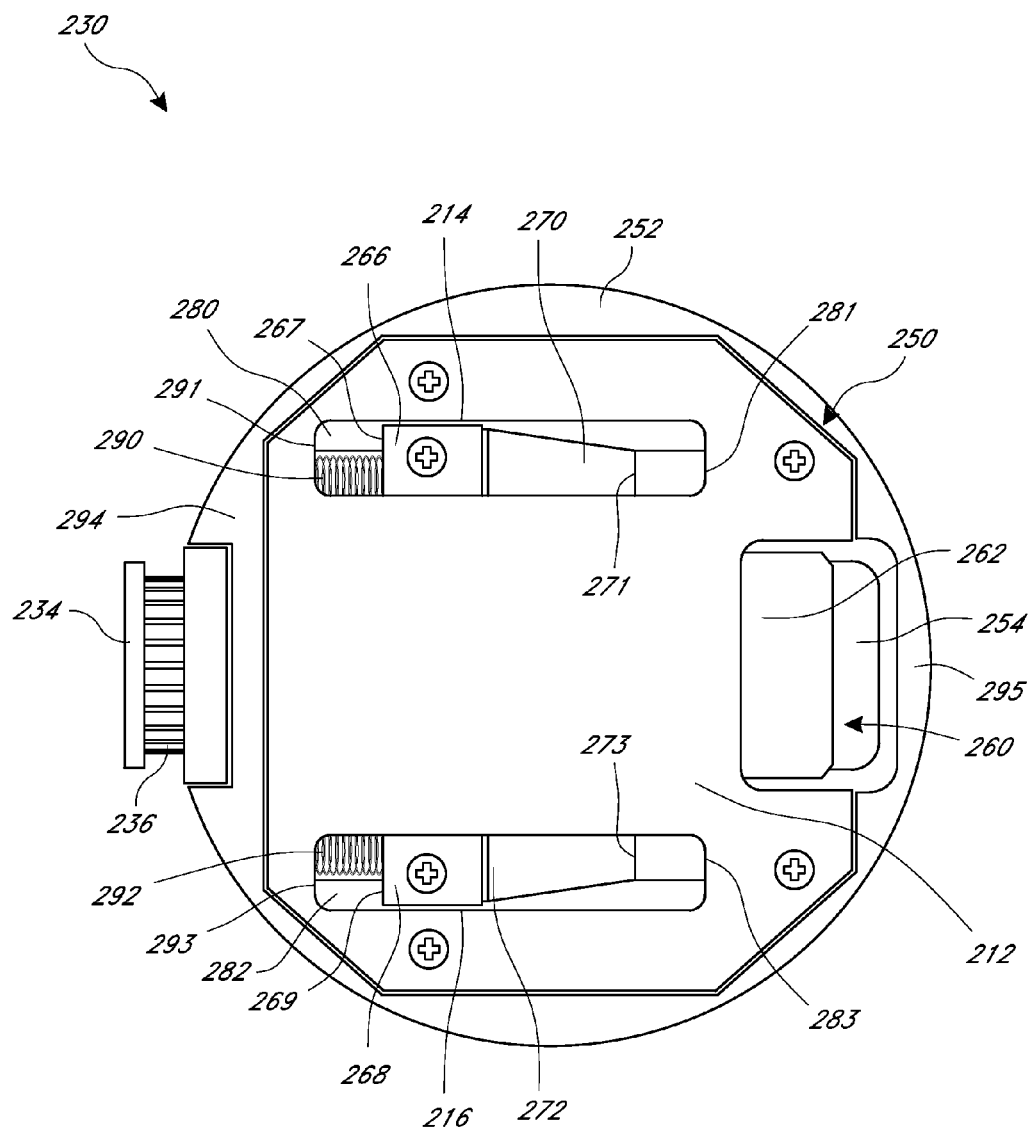
FIG. 10B is a bottom view of the apparatus of FIG. 7 with a door shown in a partially-open position.
Figure 10C:
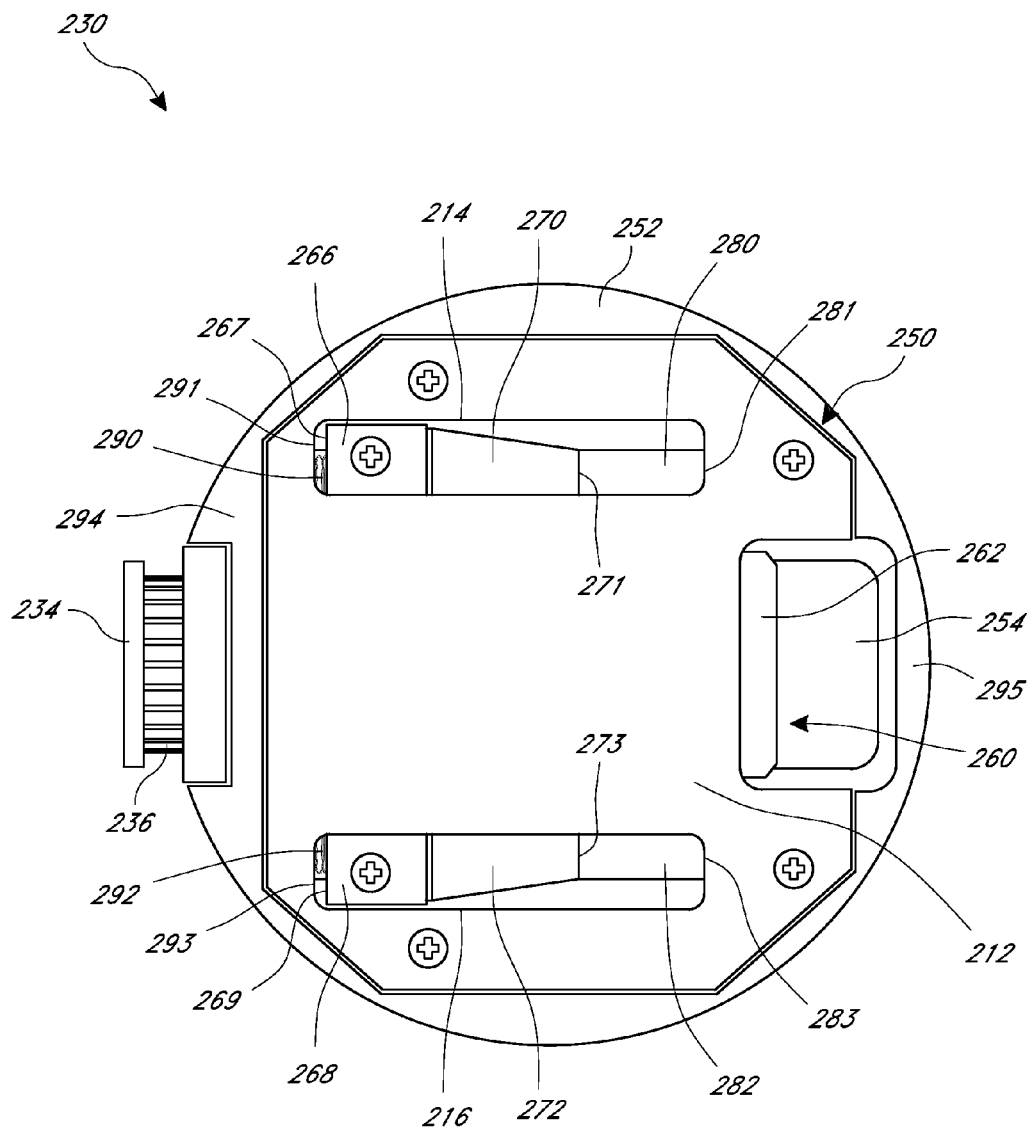
FIG. 10C is a bottom view of the apparatus of FIG. 7 with a door shown in an open position.

With reference to FIG. 9, embodiments of a bottom end portion 250 of the base portion 230 are shown. The bottom end portion 250 may comprise a bottom surface 252 and a door 260. The bottom surface 252 defines an opening 254 configured to allow coffee grounds to pass therethrough. When in a closed configuration, the door 260 substantially covers the opening 254 in the bottom surface 252. The door 260 may include a protrusion 262 configured to cover the opening 254 and a plate 264 attached to the protrusion 262 and extending across a portion of the bottom surface 252. The plate may have a first arm 266 and a second arm 268. The first arm 266 and second arm 268 may be attached to a first ramped component 270 and a second ramped component 272, respectively. The bottom surface 252 defines a first track 280 and a second track 282, which are configured to receive the ramped components 270, 272. The track may also contain a first spring 290 and a second spring 292. The springs 290, 292 are illustrated in FIGS. 10A-10C. In the illustrated embodiments, the springs 290, 292 are disposed on a side of the end portion 250 near the actuator housing 234.

Returning to FIG. 9, the bottom end portion 250 may also include an engagement plate 212 attached to the bottom surface 252. The engagement plate 212 overlies portions of the door 260 to protect and cover the door 260, yet allow the door 260 to move with respect to the bottom surface 252 and engagement plate 212. In the illustrated embodiment, the engagement plate 212 defines a first slot 214 and a second slot 216. The first slot 214 comprises an opening that may be substantially similar in shape to the first track 280 of the bottom surface 252. Likewise, the second slot 216 comprises an opening that may be substantially similar in shape to the second track 282. The slots 214, 216 provide openings to access the tracks 280, 282 and components contained therein, such as arms 266, 268, ramped surfaces 270, 272, and springs 290, 292. The slots 214, 216 also allow the arms 266, 268 and ramped surfaces 270, 272 to move with respect to the bottom surface 252. In some embodiments, the engagement plate 212 is configured to engage with an engagement portion 130 of a grinding apparatus 100.

FIGS. 10A-10C illustrate embodiments of the door 260 shown in different configurations with respect to the opening 254 of the base portion 230. FIG. 10A shows an embodiment where the door 254 is in a closed configuration; FIG. 10B shows the door in a partially-open configuration; and FIG. 10C shows the door in a fully-open configuration. While FIGS. 9 and 10A-10C show embodiments of the base portion 230 having two tracks, slots, arms, ramped surfaces, and springs, other embodiments of the base portion 230 may include only a single track, slot, arm, ramped surface, and spring. Additionally, other embodiments of the base portion 230 may include more than two tracks, slots, arms, ramped surfaces, and springs. Moreover, other embodiments of the base portion 230 may include some but not all of the track, slot, arm, ramped surface, and spring. Other embodiments of the base portion 230 may include structure to linearly translate the door 260 without using a ramped surface. For example, in some embodiments the door 260 may be actuated by a transducer, such as a solenoid. Further, other embodiments of the base portion 230 may comprise other configurations to move the door 260 apart from, or in addition to, linear translation, such as configurations providing structure to allow the door 260 to rotate with respect to the opening 254. Accordingly, it should be understood that many variations and modifications of the door 260 and structure to move the door 260 may be made to the embodiments disclosed herein.

With reference to FIG. 10A, the door 260 is shown in a closed position. The protrusion 262 of the door 260 extends over the opening 254 in the bottom surface 252 such that the protrusion 262 substantially covers the opening 254. In some embodiments, the protrusion 262 may not entirely cover the opening 254 when the door is in a closed position. The first ramped component 270 comprises a first leading edge 271 and the second ramped component 272 comprises a second leading edge 273. When the door 260 is in a closed configuration, the first leading edge 271 is disposed near a first proximal end 281 of the first track 280, and the second leading edge 273 is disposed near a second proximal end 283 of the second track 282. The first spring 290 and the second spring 292 each are in a rested position. In such a position, the springs 290, 292 engage with the arms 266, 268 and the ramped components 270, 272 to bias the door 260 in a closed position with respect to the opening 254.

In FIG. 10B, the door 260 has been translated linearly toward a trailing portion 294 of the bottom surface 252. The trailing portion 294 is disposed on a portion of the bottom surface 252 away from the opening 254. In the illustrated embodiment, the trailing portion 294 is disposed near the actuator housing 234. In particular, the leading edges 271, 273 of the ramped components 270, 272 are translated away from proximal ends 281, 283 of the tracks 280, 282. The translation may occur by engaging one or more door opening mechanisms 152 with one or more of the ramped components 270, 272. The first arm 266 comprises a first trailing edge 267 and the second arm 268 comprises a second trailing edge 269. Additionally, the first track 280 may comprise a first distal end 291 and the second track 282 may comprise a second distal end 293. Upon opening of the door 260, the trailing edges 267, 269 of the arms 266, 268 may translate linearly toward the distal ends 291, 293 of the tracks 280, 282, respectively. The springs 290, 292 may compress to accommodate such linear translation of the door 260.

FIG. 10C shows the door 260 in an open position. In such a configuration, the springs 290, 292 may be fully compressed such that trailing edges 267, 269 of the arms 266, 268 are disposed near distal ends 291, 293 of the tracks 280, 282, respectively. The leading edges 271, 273 of the ramped components 270, 272 have been further translated toward the trailing portion 294 of the bottom surface 252 such that a greater portion of each track 280, 282 is now visible from a bottom view. In this configuration, the opening preferably allows a controlled dose of coffee beans to exit the base portion 230 of the container 200. The door 260 may close by releasing a door opening mechanism 152 from engagement with the door 260. In such a configuration, the springs 290, 292 may release stored potential energy to exert a force on the arms 266, 268 to linearly translate the door 260 away from the trailing portion 294 toward a leading portion 295 of the bottom surface 252 to close the opening 254.

In some embodiments of the system 10 for grinding a material, the apparatus of the system 10 may comprise more than one door. For example, the container 200 may comprise a first door and the grinding apparatus 100 may comprise a second door. The first door of the container 200 may function similar to the door 260, as described above. For example, the first door of the container 200 may open and close to release a desired amount of coffee beans to a grinding apparatus 100. The second door of the grinding apparatus 100 may function to prevent access to internal components of the grinding apparatus 100 so as to facilitate enhanced safety characteristics of the system 10. For example, the second door of the grinding apparatus 100 may prevent a user from accessing internal components of the grinding apparatus 100 when the grinding apparatus is not in use. In addition, the second door may prevent debris from entering the grinding apparatus 100, thereby facilitating enhanced health and sanitary conditions of systems for grinding and brewing coffee.

In some embodiments, the first door and second door may each be individually actuated by a transducer, such as a solenoid. The solenoid may engage pins that actuate the first door and second door. The first door and second door may also be actuated by pins similar to the way in which the pin 152 actuates the door 260 of the container 200, as illustrated and described above with respect to FIGS. 7-10. In other embodiments, the first door and second door may be actuated through a combination of rigid or movable pins and transducers.

FIG. 11 illustrates embodiments of a container 400 where a body portion 420 and a base portion 430 of the container 400 comprise separate components. In some embodiments, the body portion 420 may be substantially similar in structure to embodiments of the body portion 220 of the container 200 described above with reference to FIGS. 1-10. Likewise, in some embodiments, the base portion 430 is substantially similar in structure to embodiments of the base portion 230 described above with reference to FIGS. 1-10. In the embodiments illustrated in FIG. 11, however, the body portion 420 may include a first mating portion 402 and the base portion 430 may have a corresponding second mating portion 404. The first mating portion 402 may be configured to engage with the second mating portion 404 to attach the body portion 420 to the base portion 430 of the container 400. The first mating portion 402 may also be configured to disengage from the second mating portion 404 to detach the body portion 420 from the base portion 430. Accordingly, the base portion 430 may be configured to removably attach to the body portion 420 such that the base portion 430 and body portion 440 comprise separate components when detached from each other.

In some embodiments, the mating portions 402, 404 comprise threaded components. In such a configuration, the body portion 420 may be attached to the base portion 430 by mating the threaded components and rotating the body portion 420 about a longitudinal axis with respect to the base portion 430. Other structure may be used to removably attach the body portion 420 to the base portion 430. For example, such a connection may be made by structure such as corresponding pin and slots, corresponding tabs and recesses, and/or adhesives. By providing the container 400 as a separate body portion 420 and base portion 430, a barista, for example, may use multiple body portions 420 containing different types of coffee beans with a single base portion 430.

Figure 12:
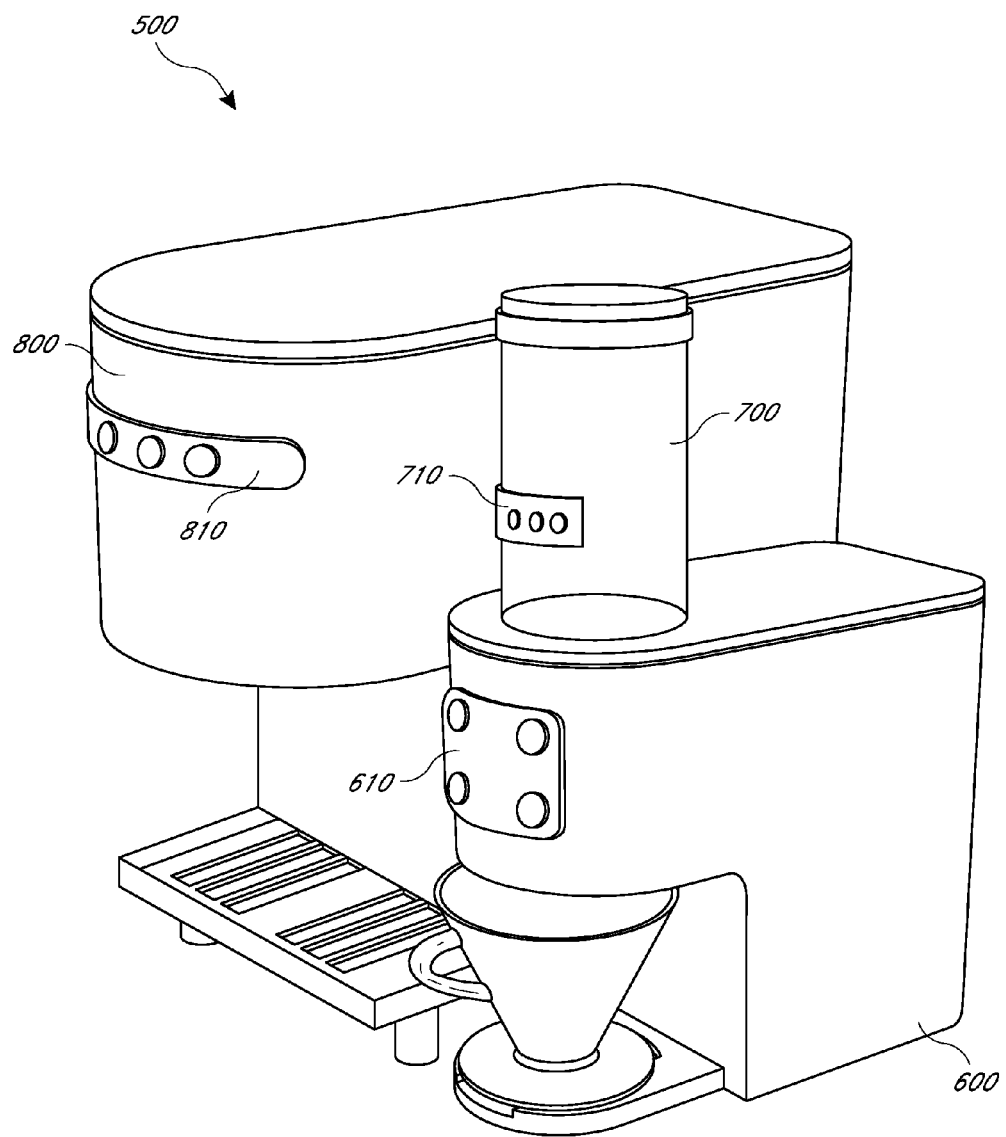
FIG. 12 is an embodiment of a system where the system includes a beverage brewing apparatus.

FIG. 12 shows embodiments of a system 500 for grinding a material where the system 500 includes a beverage brewing apparatus. The system 500 may include a grinding apparatus 600, an apparatus for containing a material or a container 700, and a beverage brewing apparatus 800. The grinding apparatus 600 and the container 700 may be similar to embodiments of the grinding apparatus 100 and the container 200, 400 described above. The beverage brewing apparatus 800 may be configured to receive coffee grounds from the grinding apparatus 600 and/or the container 700 to brew one or more cups of coffee.

The grinding apparatus 600 may include a control panel 610, the container 700 may include a control panel 710, and the beverage brewing apparatus 800 may include a control panel 810 so that any or all of the grinding apparatus 600, container 700, and beverage brewing apparatus 800 can communicate with one another. The grinding apparatus 600, container 700, and beverage brewing apparatus 800 may communicate information such as coffee bean type, bean density, bean size, and size of the desired coffee portion (e.g., small, medium, large, extra large, tall, grande, venti, trenti, etc.). Other information may also be communicated so that the grinding and brewing process may be employed easily and efficiently. Communication across multiple platforms may be employed through a variety of ways, including, but not limited to, wireless, Ethernet, serial, and ZigBee. Communication among the grinding apparatus 600, container 700, and beverage brewing apparatus 800 advantageously minimizes information that a user enters into a particular apparatus in the system so that duplicative information may not need to be entered. In one embodiment, the beverage brewing apparatus 800 comprises the Clover® Brewing System, which is currently available at certain Starbucks® stores. Embodiments of the Clover® Brewing System are illustrated and described in U.S. Pat. No. 7,673,555, which issued on Mar. 9, 2010 and is titled "Machine for Brewing a Beverage Such as Coffee and Related Method," the entire content of which is hereby incorporated by reference in its entirety.

Various methods may be employed to grind a material using embodiments of the apparatus for containing a material and the grinding apparatus described herein and shown in the accompanying figures. For example, the container and grinding apparatus may be used at a commercial setting, such as a coffee shop. The coffee shop may have several containers, such as five or more, each of which stores a different type of coffee bean. By way of example, a customer may order a medium-sized cup of a particular type of coffee. After the customer places his or her order, a barista may select the appropriate container of coffee beans and proceed to place the container within the engagement portion of the grinding apparatus.

In such an example, the grinding apparatus may have a control panel where the barista selects a control corresponding to a medium-sized cup of coffee. The grinding apparatus recognizes the type of coffee beans in the container and is programmed to active a motor to drive an actuator for an appropriate specified period of time corresponding to the type of coffee bean and desired size of coffee cup. The motor may recognize the type of coffee bean and desired portion of coffee, and then activate at a preferable speed and for an appropriate time to grind the coffee. The actuator of the grinding apparatus is actuated and engages with an actuator on the base portion of the container. The actuator on the base portion of the container then drives a directing component, such as an auger, to direct the coffee beans toward an opening in the base portion. A door opening mechanism of the engagement portion of the grinding apparatus engages with the door of the container. The door then may open to release a desired quantity of coffee beans through openings in the container and engagement portion. The grinding apparatus then grinds the coffee beans and delivers the grounds to a material holder, such as a coffee filter holder. A securing mechanism on the engagement portion of the grinding apparatus may interact with the base portion of the container to securely attach the container to the grinding apparatus when the grinding apparatus is turned on.

In such an example, when a desired quantity of coffee beans has been ground and transferred to the material holder, the motor of the grinding apparatus deactivates to stop the actuators, the directing components, and grinding features of the grinding apparatus. The door opening mechanism also disengages from the door to close the door with respect to the opening in the bottom surface of the base portion of the container. After the material holder receives the ground coffee, a barista may transfer the ground coffee to a beverage brewing apparatus to brew a cup of coffee. The barista may also remove the container from the grinding apparatus. If a customer then orders a different type of coffee, the barista may repeat this process by using a different container holding the different type of coffee beans. Advantageously, in some embodiments, the barista need not spend time and effort cleaning the grinding apparatus between uses or weighing a particular amount of coffee beans to be used for single-cup brewing.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

It should be emphasized that many variations and modifications may be made to the embodiments disclosed herein, the elements of which are to be understood as being among other acceptable examples. For example, in some embodiments disclosed herein, a removable container has a built-in directing component and a grinding apparatus has grinding features to grind coffee beans. In other embodiments, however, the grinding apparatus may have built-in grinding features instead of, or in addition to, the grinding apparatus and the container may have a door to provide a controlled dose of ground coffee to the grinding apparatus or directly to a material holder. Additionally, in some embodiments, the grinding apparatus may have directing components instead of, or in addition to, the container. For example, the grinding apparatus may include one or more augers. Accordingly, it should be understood that various features and aspects of the disclosed embodiments can be combined with or substituted for one another in order to form varying modes of the disclosed apparatus, systems, and methods. All such modifications and variations are intended to be included and fall within the scope of the embodiments disclosed herein.

What is claimed is:

1. A system, comprising:
a container comprising a body portion configured to contain a material and a base portion configured to engage with the body portion, the base portion comprising a directing component and a surface defining an opening, the directing component configured to guide the material toward the opening; and
a grinding apparatus configured to engage with the container to actuate the directing component, the grinding apparatus configured to grind the material, and wherein the grinding apparatus comprises a movable tongue configured to collect and release excess ground material.

2. The system of claim 1, wherein the material comprises coffee beans.

3. The system of claim 1, wherein the directing component comprises an auger.

4. The system of claim 1, wherein the base portion of the container is integral with the body portion of the container.

5. The system of claim 1, wherein the grinding apparatus comprises an engagement portion configured to engage with the base portion of the container.

6. The system of claim 5, wherein the opening of the base portion comprises a first opening and wherein the engagement portion of the grinding apparatus defines a second opening configured to allow the material to pass therethrough.

7. The system of claim 6, wherein the base portion of the container comprises a first door configured to open and close with respect to the first opening, the engagement portion of the grinding apparatus comprising a second door configured to open and close with respect to the second opening.

8. The system of claim 6, wherein the base portion of the container comprises a door configured to open and close with respect to the first opening, the engagement portion of the grinding apparatus comprising a door opening mechanism configured to engage with the base portion of the container to open and close the door to release a desired amount of material.

9. The system of claim 8, wherein the door opening mechanism comprises a pin.

10. The system of claim 1, wherein the grinding apparatus comprises an actuator configured to move the tongue back-and-forth along a linear path with respect to an opening in the grinding apparatus.

11. The system of claim 1, wherein the grinding apparatus comprises an actuator configured to move the tongue along a rotational path with respect to an opening in the grinding apparatus.

12. The system of claim 1 further comprising a beverage brewing apparatus configured to receive ground material and to brew a beverage using the ground material.

13. The system of claim 12, wherein one or both of the container and the grinding apparatus is configured to communicate with the beverage brewing apparatus.

14. The system of claim 13, wherein the material comprises coffee beans and the beverage comprises coffee, and wherein one or both of the container and the grinding apparatus transmits information to the beverage brewing apparatus regarding one or more of the following characteristics of the coffee beans: bean type, bean density, and grind size.

15. The system of claim 1, wherein the base portion is configured to removably attach to the body portion of the container such that the base portion and body portion comprise separate components when detached from each other.

16. The system of claim 1, wherein the base portion comprises an actuator configured to actuate the directing component.

17. The system of claim 1, wherein the base portion comprises a door that covers the opening, the door being configured to open to release a desired amount of material.

18. The system of claim 17, wherein the base portion comprises a ramped surface configured to engage with the door.

19. The system of claim 18, wherein the base portion comprises a spring configured to engage with the ramped surface to bias the door in a closed position.

20. The system of claim 18, wherein the base portion defines a track configured to receive the ramped surface, the ramped surface configured to linearly translate along the track.

21. The system of claim 18, wherein the ramped surface is configured to engage with a component of the grinding apparatus to open and close the door with respect to the opening.

22. The system of claim 1 further comprising a funnel configured to receive ground material.

23. The system of claim 22, wherein the movable tongue is configured to be in communication with the funnel.

24. The system of claim 23, wherein the movable tongue is configured to move to cause excess ground material caught on interior components of the grinding apparatus to exit the grinding apparatus.

25. The system of claim 24 further comprising a beverage brewing apparatus configured to receive ground material from the funnel and to brew a beverage using the ground material.

26. A system, comprising:
a container comprising a body portion configured to contain a material and a base portion configured to engage with the body portion, the base portion comprising a directing component and a surface defining an opening, the directing component configured to guide the material toward the opening; and
a grinding apparatus configured to engage with the container to actuate the directing component, the grinding apparatus configured to grind the material, wherein the grinding apparatus comprises an engagement portion configured to engage with the base portion of the container;
wherein the opening of the base portion comprises a first opening and wherein the engagement portion of the grinding apparatus defines a second opening configured to allow the material to pass therethrough;
wherein the base portion of the container comprises a door configured to open and close with respect to the first opening, the engagement portion of the grinding apparatus comprising a door opening mechanism configured to engage with the base portion of the container to open and close the door to release a desired amount of material, and wherein the door opening mechanism comprises a pin.

27. The system of claim 26 further comprising a beverage brewing apparatus configured to receive ground material and to brew a beverage.

28. The system of claim 27, wherein one or both of the container and the grinding apparatus is configured to communicate with the beverage brewing apparatus.

29. The system of claim 28, wherein the material comprises coffee beans and the beverage comprises coffee, and wherein one or both of the container and the grinding apparatus transmits information to the beverage brewing apparatus regarding one or more of the following characteristics of the coffee beans: bean type, bean density, and grind size.

30. The system of claim 26, wherein the directing component comprises an auger.

31. The system of claim 26, wherein the base portion of the container is integral with the body portion of the container.

32. The system of claim 26, wherein the base portion is configured to removably attach to the body portion of the container such that the base portion and body portion comprise separate components when detached from each other.

33. The system of claim 26, wherein the base portion comprises an actuator configured to actuate the directing component.

34. The system of claim 26 further comprising a funnel configured to receive ground material.

35. The system of claim 26, wherein the base portion comprises a ramped surface configured to engage with the door.

36. The system of claim 35, wherein the base portion comprises a spring configured to engage with the ramped surface to bias the door in a closed position.

37. The system of claim 35, wherein the base portion defines a track configured to receive the ramped surface, the ramped surface configured to linearly translate along the track.

38. The system of claim 35, wherein the ramped surface is configured to engage with a component of the grinding apparatus to open and close the door with respect to the opening.

39. The system of claim 26, wherein the grinding apparatus comprises a tongue configured to collect and release excess ground material.

40. The system of claim 39, wherein the grinding apparatus comprises an actuator configured to move the tongue along a linear path with respect to an opening in the grinding apparatus.

41. The system of claim 39, wherein the grinding apparatus comprises an actuator configured to move the tongue along a rotational path with respect to an opening in the grinding apparatus.

42. The system of claim 26, wherein the material comprises coffee beans.

* * * * *